(No Model.)

A. BAYER.
THERMOMETER.

No. 263,649. Patented Aug. 29, 1882.

WITNESSES:
Otto Hufeland
William Miller

INVENTOR
Adolph Bayer
BY Van Santvoord & Hauff,
ATTORNEYS

N. PETERS, Photo-Lithographer, Washington, D. C.

UNITED STATES PATENT OFFICE.

ADOLPH BAYER, OF NEW YORK, N. Y.

THERMOMETER.

SPECIFICATION forming part of Letters Patent No. 263,649, dated August 29, 1882.

Application filed June 7, 1882. (No model.)

*To all whom it may concern:*

Be it known that I, ADOLPH BAYER, a citizen of the United States, residing at New York, in the county and State of New York, have invented new and useful Improvements in Thermometers, of which the following is a specification.

This invention consists in a thermometer composed of a glass tube having three white stripes formed in its body, separated from each other by an intermediate transparent space, and having the column of mercury in said tube, together with the scale and the figures engraved upon the tube, so arranged as to be projected upon said stripes, all of which will be fully hereinafter described.

Figure 1:
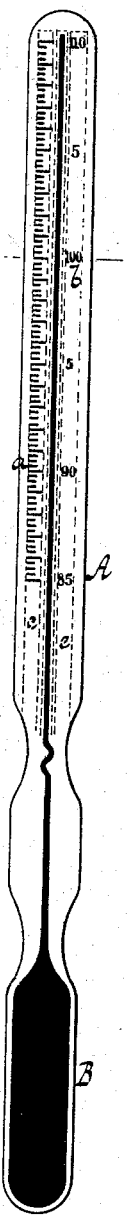
Figure 2:

In the accompanying drawings, Figure 1 represents a vertical central section of my thermometer. Fig. 2 is a transverse section in the plane $x'\ x'$, Fig. 1.

Similar letters indicate corresponding parts.

In these drawings, the letter A designates a glass tube, at the lower end of which is formed a bulb, B, for the reception of a quantity of mercury, which, when exposed to an increased temperature, rises in the bore of the tube A. On the outer surface of this glass tube, on one side of its bore, or of the column of mercury contained therein, is engraved the scale $a$, and on the opposite side of said column are engraved the figures $b$.

In the body of the glass tube A are formed three white stripes, $c\ d\ e$, in such a position that the stripe $d$ forms the background for the column of mercury, the stripe $c$ forms the background for the scale $a$, and the stripe $e$ forms the background for the figures $b$. Said stripes are formed by fusing into the glass a quantity of pulverized flint, and between them are left transparent spaces $f$, Fig. 2, so that sufficient light is thrown upon the column of mercury and upon the scale and the figures to render them clearly visible when an observation is to be made on the thermometer.

I am well aware that thermometers have heretofore been made with a single white stripe to form the background for the column of mercury; but in all thermometers of this class known to me the scale and the figures have been engraved or otherwise produced on a piece of brass, paper, or other material. It is also common to inclose into a glass tube a paper containing a scale and figures, so that the white surface of the paper forms the background for the column of mercury. Such I do not claim as my invention.

What I claim as new, and desire to secure by Letters Patent, is—

A thermometer consisting of a glass tube having three white stripes formed in its body, separated from each other by an intermediate transparent space, and having the column of mercury in said tube, together with the scale and the figures engraved upon the tube, so arranged as to be projected upon said stripes, substantially as and for the purpose described.

In testimony whereof I have hereunto set my hand and seal in the presence of two subscribing witnesses.

ADOLPH BAYER. [L. S.]

Witnesses:
 W. HAUFF,
 E. F. KASTENHUBER.